A. N. JOHNSON.
REVERSIBLE CAR REPLACER.
APPLICATION FILED MAR. 27, 1912.
1,040,206.
Patented Oct. 1, 1912.
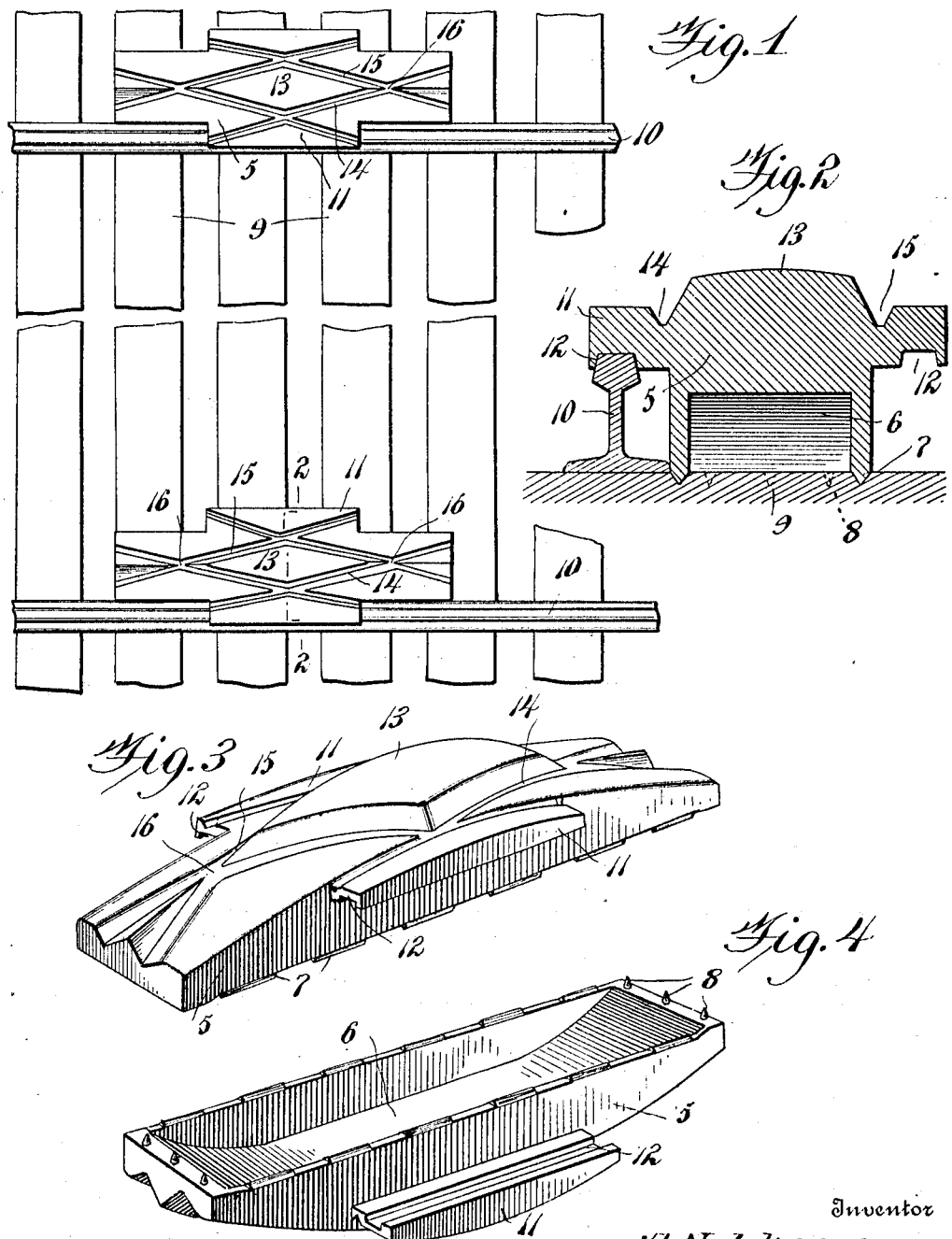
Inventor
A. N. Johnson
Witnesses
W. S. McDowell
L. O. Parker
By Victor J. Evans
Attorney

UNITED STATES PATENT OFFICE.

ANDREW N. JOHNSON, OF CENTERVILLE, TENNESSEE.

REVERSIBLE CAR-REPLACER.

1,040,206.  Specification of Letters Patent.  Patented Oct. 1, 1912.

Application filed March 27, 1912. Serial No. 686,473.

*To all whom it may concern:*

Be it known that I, ANDREW N. JOHNSON, a citizen of the United States, residing at Centerville, in the county of Hickman and State of Tennessee, have invented new and useful Improvements in Reversible Car-Replacers, of which the following is a specification.

The invention relates to car replacers and more particularly to the class of reversible car replacers.

The primary object of the invention is the provision of a car replacer in which a wrecked car may be run on to the track either from the outside or inside thereof, the replacer being capable of being positioned at the outside or inside of each rail of the track, for this purpose.

Another object of the invention is the provision of a car replacer in which a rail engaging flange is formed at each side thereof so that it can engage the rail of a track so as to prevent the possibility of displacement of the replacer when engaged by car wheels for the running of the latter on to the track.

A further object of the invention is the provision of a car replacer in which the base thereof is formed with spurs and chisel edged projections to bite into a cross-tie when superimposed thereon so as to obviate the slipping or displacement of the replacer while in use, thereby assuring the running of the derailed car on to the track.

A still further object of the invention is the provision of a car replacer which is simple in construction, strong, durable, capable of being reversed, thoroughly reliable and efficient in its purpose and inexpensive in manufacture.

With these and other objects in view the invention consists in the construction, combination and arrangement of parts as will be hereinafter more fully described, illustrated in the accompanying drawing, and pointed out in the claim hereunto appended.

In the drawing:—Figure 1 is a fragmentary top plan view of a track showing a pair of car replacers constructed in accordance with my invention and applied to the rails of the track both at the outside and inside thereof. Fig. 2 is a sectional view on an enlarged scale taken on the line 2—2 of Fig. 1. Fig. 3 is a perspective view of one of the car replacers. Fig. 4 is a similar view looking toward the bottom thereof.

Similar reference characters indicate corresponding parts throughout the several views in the drawing.

Referring to the drawings by numerals the car replacer comprises an upwardly bowed or arched body 5 preferably constructed from metal, the same being formed with a recess or hollow 6 opening through its bottom, the said recess or hollow extending longitudinally thereof and forming an arch therein. The said wall and ends of the body 5 at the bottom edges thereof are provided with chisel edged projections and pointed spurs 7 and 8 respectively which are designed to bite into the cross-tie 9 when the body 5 is superimposed thereon in juxtaposition to the rail 10 fastened to the tie, thus it being seen that the said body will be prevented from slipping or becoming displaced on the tie when the replacer is in use.

Formed on the side walls of the body 5 medially of the length thereof are outwardly projecting flanges 11 provided with channels or grooves 12 in their end faces for receiving the balls of the rails 10, thereby insuring a positive engagement of the body 5 with each rail. It is of course understood that when a derailed car is to be run on to the rails 10 of the track there is employed a pair of the car replacers, but in describing this invention only one replacer has been referred to because it is deemed needless to describe in detail a pair of car replacers as the same are of complementary construction and a detail description of one is sufficient for the other.

Formed centrally on the top of the body 5 and rising therefrom is a substantially diamond-shaped swell or enlargement 13 while formed in the top of the said body at the marginal side edges of the swell or enlargement 13 are car-wheel flange-engaging grooves 14 and 15 respectively which extend diagonally in the body from the ends thereof and open through opposite sides of the same. Said grooves 14 and 15 cross each other at 16 at the corners of the enlargement or swell 13 and extend to and open through the ends of the body 5, and in this manner, the car wheels may be run on to the body 5 so that the wheel flanges will engage in either of the said grooves 14 or of whether the car replacer is placed at the and on to the rails of the track irrespective of whether the car replaced is placed at the inside or the outside of the rail of the track. Also by reason of the disposition of the grooves 14 and 15 on the body 5 the car replacer can be reversed and applied to the outside or the inside of the rail of the track for the running of the car wheel on to the same and to permit this, the grooves 15 are cut through the inner corners of one side flange 11, while the grooves 14 are cut through the outer corners of the other flange 11, as shown.

From the foregoing description, taken in connection with the accompanying drawing, it is thought that the construction and operation of the invention will be clearly understood, and therefore a more extended explanation has been omitted.

What is claimed is:—

A car replacer comprising a body of substantially rectangular shape and having a hollow in its bottom and a convex upper face, flanges projecting laterally from opposite sides of the said body medially thereof and having grooves in their under sides for receiving the tread portions of railway rails, chisel edges formed at intervals on the bottom of said body at opposite sides of the hollow therein and spurs projecting from the bottom of the body at opposite ends of the hollow therein, the said body being provided with criss-cross grooves in its upper face and extended through the side flanges, whereby the said grooves will open through the ends of the flanges and the ends of the body.

In testimony whereof I affix my signature in presence of two witnesses.

ANDREW N. JOHNSON.

Witnesses:
CORTIS PEELER,
ARTEMAS ARNOLD.

Copies of this patent may be obtained for five cents each, by addressing the "Commissioner of Patents, Washington, D. C."